April 11, 1939.  J. L. DEEGAN, SR  2,153,686
COMBINATION FLOOR WASHER AND DRIER
Filed Aug. 17, 1937   4 Sheets—Sheet 1
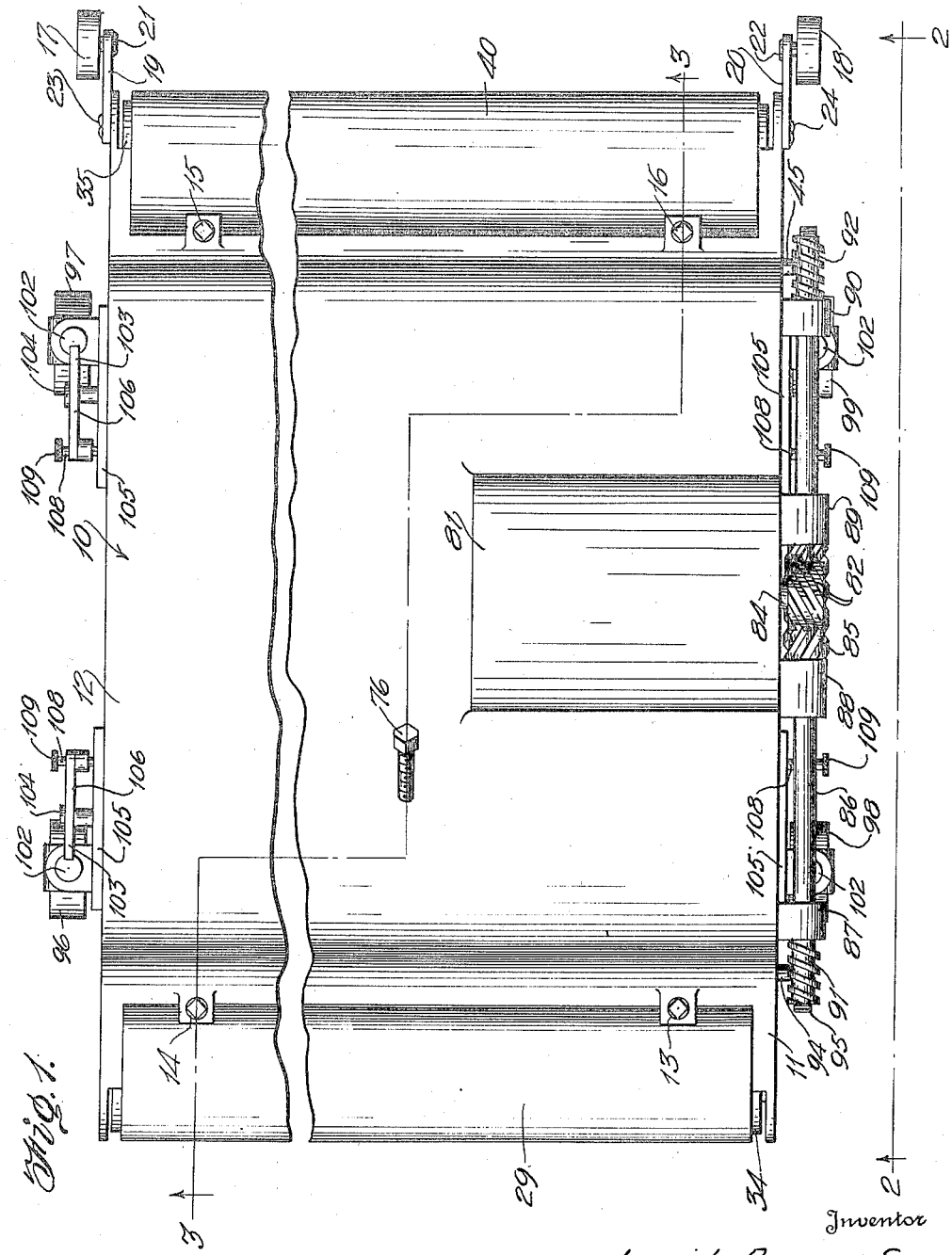

April 11, 1939.  J. L. DEEGAN, SR  2,153,686
COMBINATION FLOOR WASHER AND DRIER
Filed Aug. 17, 1937   4 Sheets-Sheet 2
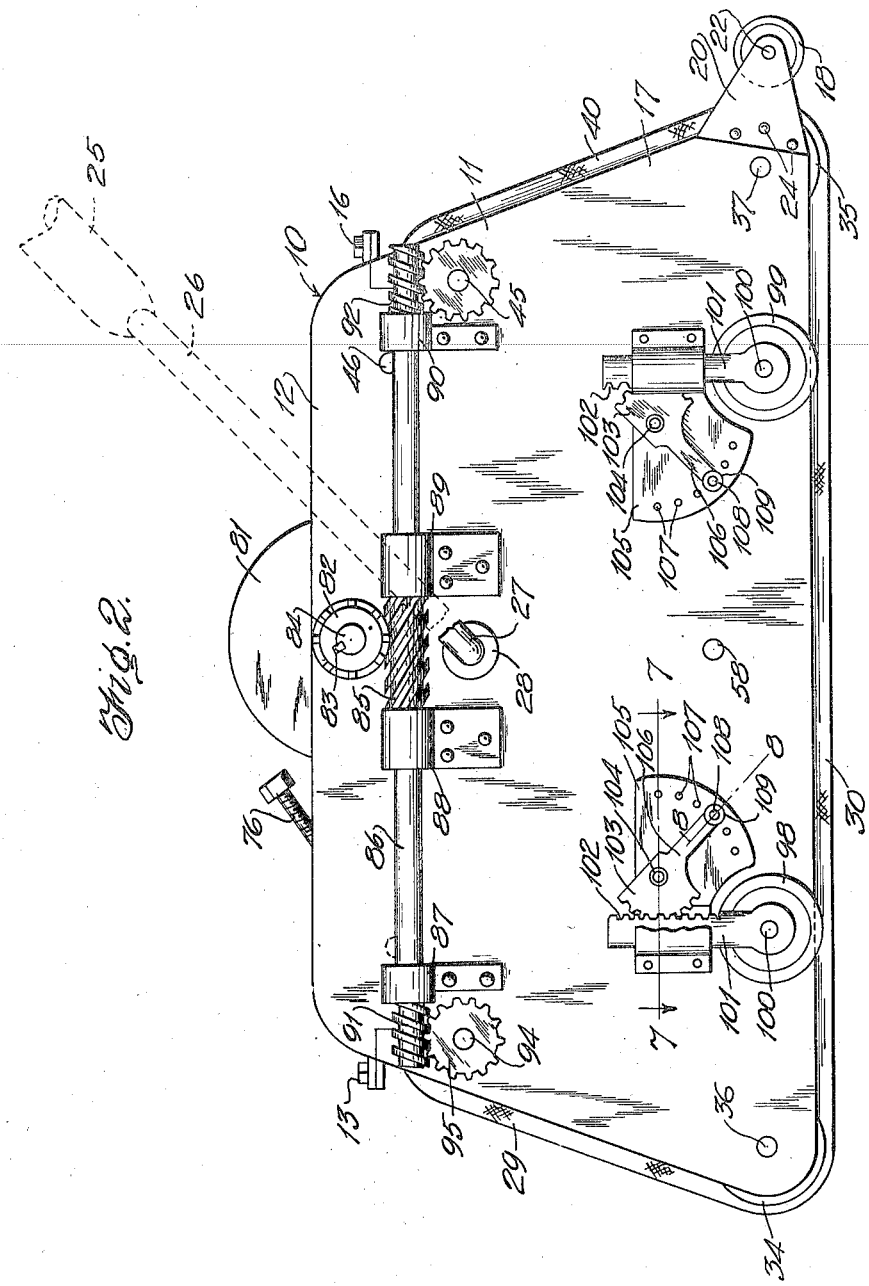
Inventor
JOHN L. DEEGAN, SR.,
By Kimmel & Crowell
Attorneys

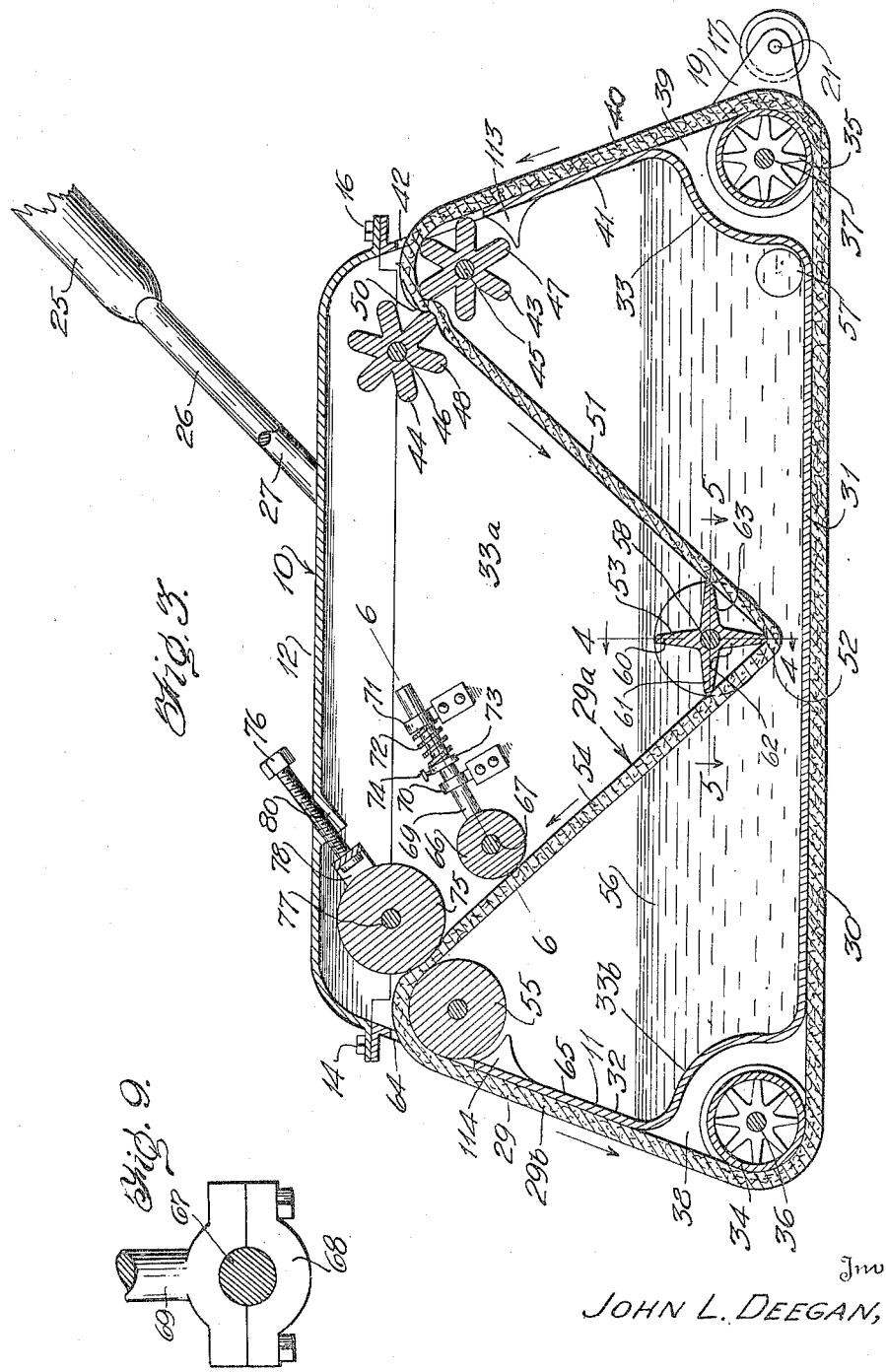

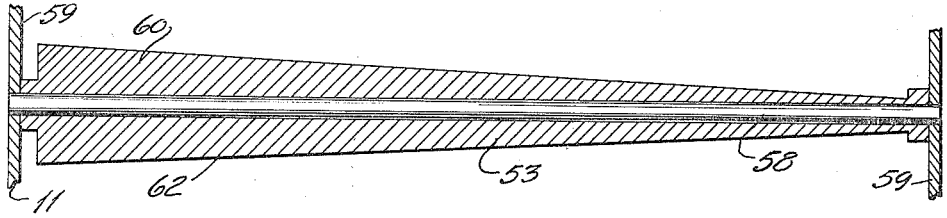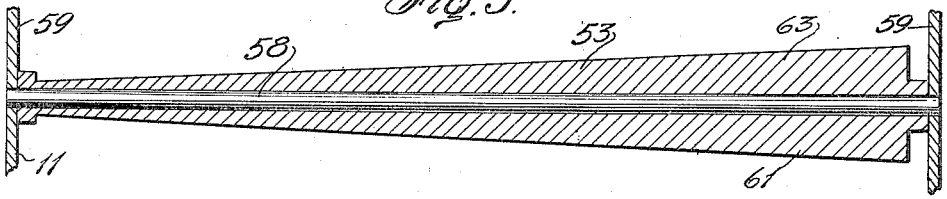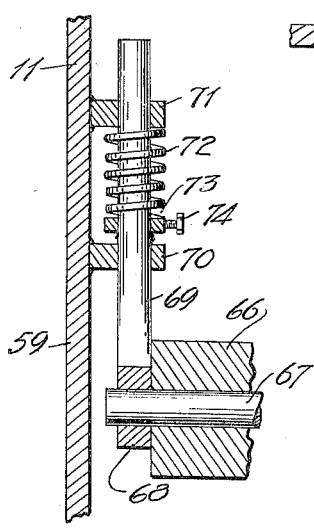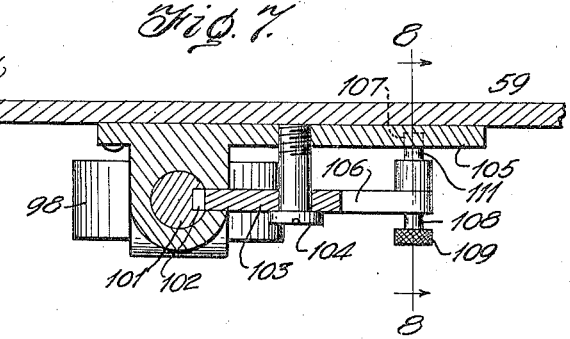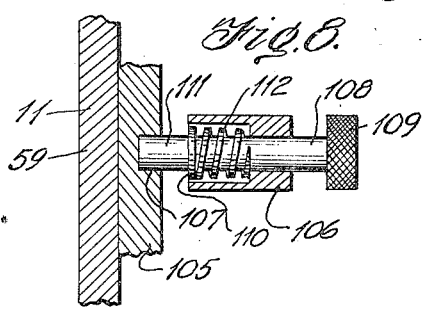

Patented Apr. 11, 1939

2,153,686

UNITED STATES PATENT OFFICE 2,153,686

COMBINATION FLOOR WASHER AND DRIER

John L. Deegan, Sr., Pottstown, Pa.

Application August 17, 1937, Serial No. 159,557

3 Claims. (Cl. 15—99)

This invention relates to combination floor washers and driers and more particularly to power actuated devices of this class.

One object of this invention is to provide a new and improved device of the class described. Another object is to provide a device which is readily convertible from a floor washer into a floor drier and vice versa. A further object is to provide a device of this class which is power actuated. Another object is to provide an electrically driven floor washer and drier. Yet a further object is to provide a device of this kind which is readily assembled and taken apart. Other objects and advantages of this invention will appear in the following description when considered in connection with the accompanying drawings.

In the drawings Fig. 1 is a plan view of an apparatus incorporating features of this invention. Fig. 2 is a side elevation taken on the line 2—2 in Fig. 1. Fig. 3 is a transverse longitudinal cross section through the apparatus taken on the irregular line 3—3 in Fig. 1. Fig. 4 is a vertical transverse cross section of the agitator taken on the line 4—4 in Fig. 3. Fig. 5 is a horizontal transverse cross section taken on the line 5—5 in Fig. 3. Fig. 6 is a detail section on the line 6—6 of Fig. 3. Fig. 7 is a detail section taken on the line 7—7 of Fig. 2. Fig. 8 is a detail section taken on the lines 8—8 in Figs. 2 and 7, and Fig. 9 is a fragmentary view in side elevation illustrating the split bearing.

The device contemplated by this invention includes a housing provided with means for manually moving the device from place to place, and power actuated means for driving an endless fabric belt through a body of liquid and through a means for adjustably varying the degree of dryness of the fabric after it leaves the body of liquid. The device also includes means for allowing the fabric to engage a floor surface so that it may either wash or dry the floor surface.

The device comprises a housing 10 which has an over-all longitudinal configuration like a trapezoid. This housing comprises the lower portion 11 having an open top and a removable top portion 12 which is adapted to be secured to the lower portion by means of a plurality of fastening devices 13, 14, 15, 16. At the rear 17 of the housing is provided means for moving the device from place to place. This means comprises rollers 17 and 18 which are rotatably secured on the brackets 19 and 20 by the axles 21 and 22. The brackets may be secured to the housing by the fastening means 23 and 24 or they may be made an integral part of the housing if such construction is adapted to production methods. For the purpose of cooperating with these rollers and manually moving the device about, a handle 25 having a bifurcated end, provided with arms 26 and 27, is pivotally secured to the side of the housing as at 28 in Fig. 2. This pivot point can be shifted to some other position depending upon the exigencies of construction.

The portion 11 of the housing 10 includes a bottom 31, a front wall 32, a rear wall 41 and a pair of side walls 33ª. The lower portions of the front and rear walls are inset with respect to the lower corner portions of the side walls, as at 33ᵇ to form outwardly opening recesses 38, 39. The upper parts of the walls 32, 41 are formed with openings 64, 42 constituting an outlet and an intake respectively.

The cleaning and drying operations are accomplished by means of an endless conveyor or belt 29 preferably made of an appropriate woven fabric material. The belt 29 includes a forwardly travelling upper run 29ª which passes through the portion 11 of housing 10, a downwardly travelling leading run 29ᵇ arranged on the outer face of wall 32, a rearwardly travelling bottom run 30 and an upwardly travelling follower run 40 arranged on the outer face of wall 41. The belt 29 has a floor engaging portion 30 which travels along the lower face of the bottom 31 of the housing and which is provided by the lower run 30 of the belt. The upper run 29ª of the belt enters the housing through the intake 42 and passes from the housing through the outlet 64. The leading run 29ᵇ of the belt travels downwardly from outlet 64 and around roller 34. The follower run 40 of the belt travels upwardly around roller 35 to the intake 42. The rollers 34, 35 are arranged in the recesses 38, 39 respectively and are carried by shafts 36, 37 respectively mounted on the lower corners of the side walls 33ª. The belt after entering the housing is engaged by the interengaging paddle wheels 43 and 44, the former being supported in the lower part of the housing by a shaft 45 and the latter being supported in the upper part by a shaft 46. These two interlocking paddle wheels form the power drive for the fabric belt and pull the belt through and about the floor washer. Each wheel comprises a plurality of radially extending interengaging paddles 47 and 48 respectively. The interengaging of these paddles firmly grips the fabric as at the point 50.

The endless belt has an angularly downwardly extending stretch 51, extending between the power paddles 43 and 44 and passing at its lowermost point 52 about the agitator paddle 53, and then it has an angularly upwardly extending stretch 54 passing around the upper roller 55. The lower portions of these two angularly extending stretches of the fabric belt extend through a body of liquid 56 which latter is the liquid used for washing and cleaning the floors or other surfaces being treated. When it is desired to drain this body of liquid from the housing it is accomplished by opening the drain plug 57 in the lower right hand part of the housing as seen in Fig. 3.

The agitator 53 is rotatably mounted upon a central shaft or axle 58 which latter is slidably secured in appropriate bearing portions carried by the side walls of the housing 11 and 59. The agitator itself is composed of a plurality of radially extending blades 60, 61, 62 and 63 which are oppositely tapered as in Figs. 4 and 5. The spoke portions 60 and 62 in Fig. 4 tapering from left to right and the blades 61 and 63 tapering from right to left. It will be readily appreciated that the fabric belt in passing about this agitator member will be receiving beating action at the opposite sides so that dirt removed from the surface being cleaned will be permanently liberated from the fabric and will be released into the body of liquid.

It will now be appreciated that when it is desired to wash a floor surface that the fabric endless belt will be driven by the power paddles 43 and 44 and will pass through the body of liquid being thoroughly treated and will then pass around the power driven roller 55 out of the front opening 64 of the forward housing wall 65 and will pass down around the roller 34 cleaning the floor surface and then around the roller 35 back into the device.

If the fabric belt stretches in use and it becomes necessary to take up the slack, this is accomplished by an idler roller 66 which is yieldably and adjustably carried in the housing. The idler roller is mounted upon a shaft 67 which latter is supported in a split bearing 68. The split bearing is carried on a floating shaft 69 which is supported in two bearings 70 and 71. The shaft 45 is adjustably and yieldably secured in these bearings by means of the spring 72 which abuts at one end against the bearing member 71 and at the opposite end against the collar 73 which is secured to the shaft by a set screw 74. A similar arrangement is also on the inside of the opposite wall of the housing and it will be readily understood that by setting the collar at different points the slack in the belt is yieldably taken up.

When it is desired to use the device as a drier the drying roller 75 is adjusted by the adjusting screw 76 so that it squeezes the endless belt 29 between the two rollers 55 and 75. In this manner the liquid is squeezed out of the fabric belt so that the stretch of belt coming in contact with the surface being treated is sufficiently dry so that it will readily absorb liquids on the floor surface.

The drying roller is free to rotate on the shaft 77 which latter is carried by a yoke 78 which is in turn carried by the adjusting bolt 76. This latter is screwthreaded and passes through a threaded portion of the abutment 80 in the housing member 12. It will be understood that if it is desired to replace the fabric belt that when the top 12 of the housing is removed that the rollers 48 and 75 will be removed with it. All that remains necessary is to remove the shaft 58 so that the agitator paddle may be removed and to disconnect the split bearings, holding the shaft 67 so that the roller 66 may be removed. The fabric is then easily removed from the device.

The power drive for the apparatus is obtained by mounting a motor 81 on the top member of the housing and providing the motor with a worm wheel 82 which is keyed at 83 on the motor shaft 84. The worm wheel on the motor shaft engages the worm 85 which latter drives the shaft 86. The shaft 86 is supported on the side of the housing by the bearing members 87, 88, 89 and 90. The worm wheels 91 and 92 are respectively secured at the opposite ends of shaft 86. The worm wheel 92 drives the shaft 45 by means of the worm gear which is secured to the shaft 45 and which meshes with the worm gear 92.

The roller 55 is mounted on a drive shaft 94 and the latter is driven by the worm wheel 91 through the intermediation of the worm gear 95, the latter being fastened to the shaft 94 and driven by the gear 91. It is now readily understood that the motor by means of the various drive shafts and gears, effects a power drive to the wheels 55 and 43 which in turn effect the movement of the fabric belt. Appropriate housing parts not shown are arranged to conceal the various gears in the power drive so that they will not injure the operator or catch or engage in any materials or objects which they might damage.

A plurality of adjustable casters 96, 97, 98 and 99 are provided for the purpose of varying the amount of pressure on the fabric. Each caster is rotatably mounted upon an axle or shaft 100 which in turn is carried by a shaft 101 having an integral rack bar 102. A segment of a pinion 103 is pivoted at 104 with its teeth meshing with the rack on the shaft 101. All of these parts are secured upon a plate 105 which in turn is secured to the housing. The opposite end of the segment pinion is provided with a lever arm 106 at the outer end of the latter, and adjustable locking means is provided so that the casters may be raised and lowered in the proper position. The locking means comprises a plurality of holes 107 bored into the plate 105 and a yieldable pin 108 which is arranged to engage in the various holes. Each pin contains a knurled operating handle 109 and has a collar secured at an inner portion of the stem 111 with a spring 112 positioned between the collar and the arm 106 so that the pin is normally urged into the hole. The casters are adapted to travel on the floor when moving the device from place to place.

The baffles 113 and 114 prevent sloshing out of the liquid.

Although a preferred embodiment of this invention has been illustrated and described, variations coming within the true spirit and scope of this invention are to be determined by the appended claims.

What I claim is:

1. In a floor washing and drying device of that type including a housing adapted to contain a body of liquid, and a liquid carrier in the form of a driven endless belt including an upper run for passing through the housing to contact with the liquid and other runs for travelling about the housing, the combination of a slidably mounted removable shaft arranged within the lower portion of and adapted to be supported from opposed walls of the housing, and a revoluble agitator element carried by said shaft and including radially disposed blades, each blade being tapered lengthwise from one end to the other, said blades being alternately disposed with respect to each other.

2. In a floor washing and drying device of that type including a housing adapted to contain a body of liquid, and a liquid carrier in the form of a driven endless belt including an upper run for passing through the housing to contact with the liquid and other runs for travelling about the housing, the combination of two aligned pairs of spaced superposed parallel bearings adapted to be secured to the inner faces of a pair of opposed walls of the housing, a pair of shafts, each extending through and slidably mounted in a pair of said bearings, resilient pressure exerting means for and carried by a shaft between its pair of bearings and abutting the upper bearing of the pair, a bearing on the lower end of each of said shafts, a horizontal shaft having its ends mounted in the said bearings on the lower ends of the said pair of shafts, and a slack-take-up roller carried by said horizontal shaft for bearing against a run of said belt.

3. In a floor washing and drying device, a housing including front, side and rear walls and a bottom adapted to contain a body of liquid, said housing being formed in the upper part of its front wall with an outlet, and in the upper part of its rear wall with an intake, a liquid carrier in the form of an endless belt having respectively a V-shaped depending upper run travelling through said intake into the housing, through the latter and the liquid and from the housing through said outlet, a leading run travelling downwardly against the outer face of said front wall, a lower run travelling against the outer face of said bottom and a follower run travelling upwardly against the outer face of said rear wall, an agitating means arranged within the lower portion of the housing at the transverse center of the latter, disposed over and engaging spaced parts of the upper face of the said upper run, drive means for the carrier arranged in the upper portion of the housing and formed of upper and lower elements and with the lower element opposing in close relation to said intake, combined carrier squeezing and guide means within the upper part of the housing and formed of upper and lower elements and with the lower element opposing in close relation said outlet, said front and rear walls having their lower portions inset with respect to the lower corner portions of the side walls, and rollers journaled in the said lower corner portions of the side walls, opposing said inset portions and against which travels said carrier.

JOHN L. DEEGAN, Sr.